United States Patent
Takatani et al.

(10) Patent No.: US 6,894,890 B2
(45) Date of Patent: May 17, 2005

(54) SOLID ELECTROLYTIC CAPACITOR AND MANUFACTURING METHOD THEREOF

(75) Inventors: Kazuhiro Takatani, Takatsuki (JP);
Mutsumi Yano, Hirakata (JP);
Mamoru Kimoto, Hirakata (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/810,825

(22) Filed: Mar. 29, 2004

(65) Prior Publication Data

US 2004/0190227 A1 Sep. 30, 2004

(30) Foreign Application Priority Data

Mar. 31, 2003 (JP) ........................................ 2003-097305

(51) Int. Cl.⁷ ............................ H01G 9/04; H01G 9/145
(52) U.S. Cl. ...................................... 361/532; 361/528
(58) Field of Search ................................. 361/523–541

(56) References Cited

U.S. PATENT DOCUMENTS 4,463,030 A * 7/1984 Deffeyes et al. ............ 427/216
5,621,608 A * 4/1997 Arai et al. .................. 361/525
2003/0081373 A1 * 5/2003 Hamada et al. ............. 361/502

FOREIGN PATENT DOCUMENTS

| JP | 5-315200 | | 11/1993 | |
| JP | 9-167719 | * | 6/1997 | ............ H01G/9/05 |

* cited by examiner

*Primary Examiner*—Eric W. Thomas
(74) *Attorney, Agent, or Firm*—McDermott Will & Emery LLP

(57) ABSTRACT

A solid electrolytic capacitor has a structure in which a dielectric layer, an electrolyte, a carbon layer, and a metal layer are formed in this order on the surface of an anode. The anode is composed of a porous sinter of tantalum particles. The dielectric layer is composed of a dielectric oxide film formed by anodizing the surface of the anode in an aqueous solution of phosphoric acid, for example. The electrolyte is composed of a conductive polymer, such as polypyrrole or polythiophene. The metal layer is formed by preparing a silver paste by mixing silver particles having an average particle diameter of not larger than 0.05 $\mu$m, a protective colloid, and an organic solvent, and applying the silver paste on the surface of the carbon layer, and drying the silver paste at approximately 150° C. or higher.

7 Claims, 2 Drawing Sheets

F I G. 2
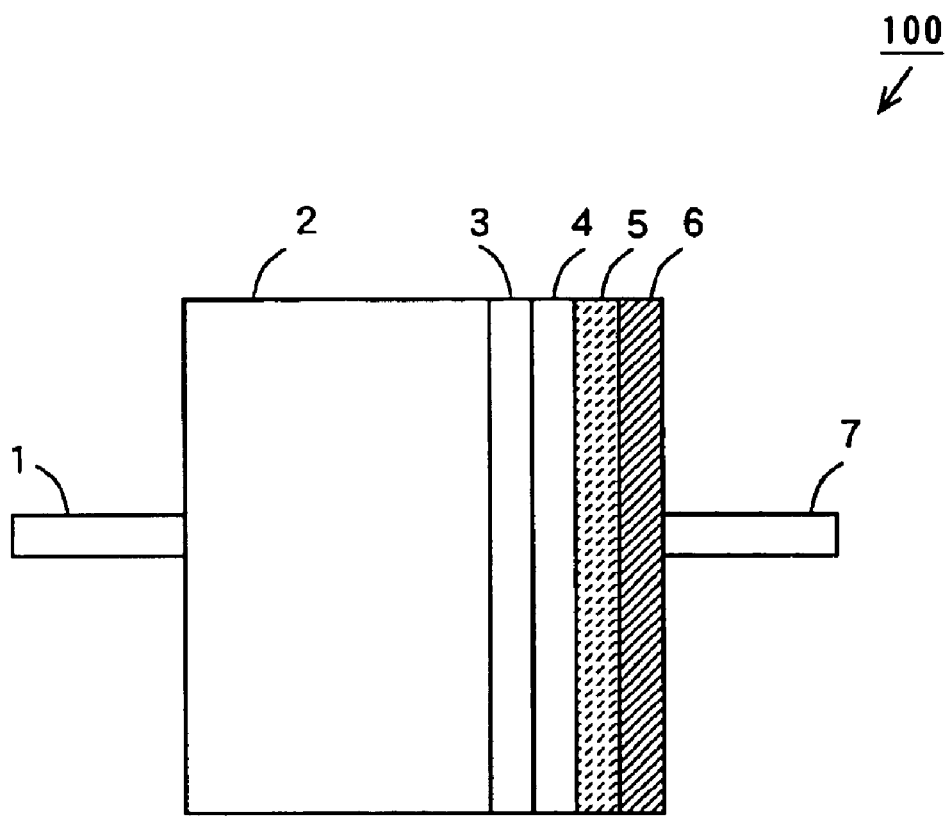

SOLID ELECTROLYTIC CAPACITOR AND MANUFACTURING METHOD THEREOF

BACKGROUND OF THE INVENTION

1. Field of the Invention

The present invention relates to a solid electrolytic capacitor and a manufacturing method thereof.

2. Description of the Background Art

In accordance with recent trend in increasing the frequency of electronic equipment such as personal computers, instantaneous supply of current to electronic circuits is required. For this reason, it is desired to develop solid electrolytic capacitors having a smaller value of equivalent serial resistance (hereinafter referred to as ESR).

It is noted here that the ESR is the sum of dielectric loss, resistivity of an electrolyte, and contact resistance between the electrolyte and a cathode. In a high frequency region, the resistivity of an electrolyte and the contact resistance between the electrolyte and a cathode are predominant.

In general, cathodes formed by two layers, a carbon layer and a silver paste layer, are used for solid electrolytic capacitors (Electrochemical Society of JAPAN, ed., *Electrochemistry Hand book (Denkikagaku Binran): MARUZEN CO., LTD*), and in particular, in order to reduce non-uniformity of the connection strength between a cathode layer and a cathode lead terminal, the use of silver paste layers composed of silver particles having an average particle diameter of not smaller than 3 µm nor larger than 5 µm has been proposed (refer to JP-5-315200-A.)

In the above-mentioned solid electrolytic capacitor, however, the ESR in a high frequency region is affected by the contact resistance between the electrolyte and the cathode. In the case of a cathode formed by a carbon layer and a silver paste layer, in particular, the contact resistance between the carbon layer and the silver paste layer is attributed to a rise in the ESR, thereby making it difficult to reduce the ESR in a high frequency region.

SUMMARY OF THE INVENTION

An object of the present invention is to provide a solid electrolytic capacitor having reduced ESR and a method of manufacturing the same.

A solid electrolytic capacitor according to one aspect of the present invention comprises an anode composed of a metal; a dielectric layer composed of an oxide of the metal and formed on the surface of the anode; an electrolytic layer; and a cathode layer in this order, the cathode layer having a laminated structure of a carbon layer and a metal layer composed of metal particles having an average particle diameter of not larger than 0.05 µm and formed on the carbon layer.

In the solid electrolytic capacitor according to the present invention, the metal particles included in the metal layer have the average particle diameter of not larger than 0.05 µm, so that the surface of the carbon layer is uniformly coated with the fine metal particles. This makes the contact resistance between the carbon layer and the metal layer smaller. As a result, the equivalent serial resistance in a high frequency region is reduced.

The average particle diameter of the metal particles is preferably not smaller than 0.01 µm. This avoids an increase in the contact resistance caused by an increase of interfaces of the metal particles.

The metal particles preferably includes at least one kind of metal selected from the group consisting of silver, gold, and platinum.

In this case, the conductivity of the metal layer is increased because of the high conductivity of silver, gold, or platinum, thereby making the contact resistance between the carbon layer and the metal layer even smaller.

The metal layer may include a protective colloid. In this case, flocculation of the metal particles that may occur during preparation of the metal paste is prevented. Accordingly, the metal particles are uniformly dispersed in the metal paste, so that the contact resistance between the carbon layer and the metal layer is made even smaller. As a result, the equivalent serial resistance in a high frequency region is further reduced.

The electrolytic layer may be composed of a conductive polymer. This results in large capacitance.

The anode preferably includes at least one kind of metal selected from the group consisting of tantalum, aluminum, niobium, and titanium. The oxides of tantalum, aluminum, niobium, and titanium each have a high relative dielectric constant. This results in large capacitance with small size.

A method of manufacturing a solid electrolytic capacitor according to another aspect of the present invention includes the steps of forming on the surface of an anode composed of a metal a dielectric layer composed of an oxide of the metal; forming an electrolytic layer on the dielectric layer; forming a carbon layer on the dielectric layer; and forming on the carbon layer a metal layer composed of metal particles having an average particle diameter of not larger than 0.05 µm.

In the method of manufacturing the solid electrolytic capacitor according to the present invention, the metal particles included in the metal layer have the average particle diameter of not larger than 0.05 µm, so that the surface of the carbon layer is uniformly coated with the fine metal particles. This makes the contact resistance between the carbon layer and the metal layer smaller. As a result, a solid electrolytic capacitor having reduced equivalent serial resistance in a high frequency region can be achieved.

The average particle diameter of the metal particles is preferably not smaller than 0.01 µm. This avoids an increase in the contact resistance caused by an increase of interfaces of the metal particles.

The step of forming the metal layer may include the steps of applying on the carbon layer a metal paste including the metal particles; and drying the metal paste at a temperature of 150° C. or higher after applying the metal paste.

This makes the contact resistance between the carbon layer and the metal layer even smaller, thereby further reducing the equivalent serial resistance in a high frequency region.

The step of forming the metal layer may include the steps of preparing a metal paste by mixing the metal particles and a protective colloid in an organic solvent; and forming the metal paste on the carbon layer.

In this case, the protective colloid prevents flocculation of the metal particles that may occur in the organic solvent. Accordingly, the metal particles are uniformly dispersed in the metal paste, so that the contact resistance between the carbon layer and the metal layer is made even smaller. As a result, the equivalent serial resistance in a high frequency region is further reduced.

A method of manufacturing a solid electrolytic capacitor according to still another aspect of the present invention includes the steps of forming on the surface of an anode composed of a metal a dielectric layer composed of an oxide of the metal, an electrolytic layer, and a carbon layer in this order; preparing a metal paste by mixing metal particles and a protective colloid in an organic solvent; and forming a metal layer by applying the metal paste on the carbon layer.

In the method of manufacturing the solid electrolytic capacitor according to the present invention, the protective colloid prevents flocculation of the metal particles that may occur in the organic solvent during preparation of the metal paste. Accordingly, the metal particles are uniformly dispersed in the metal paste, so that the contact resistance between the carbon layer and the metal layer is made smaller. As a result, the equivalent serial resistance in a high frequency region is reduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a schematic diagram of a solid electrolytic capacitor prepared in inventive examples 1 to 12 and a comparative example.

DESCRIPTION OF THE PREFERRED EMBODIMENTS

Figure 1:
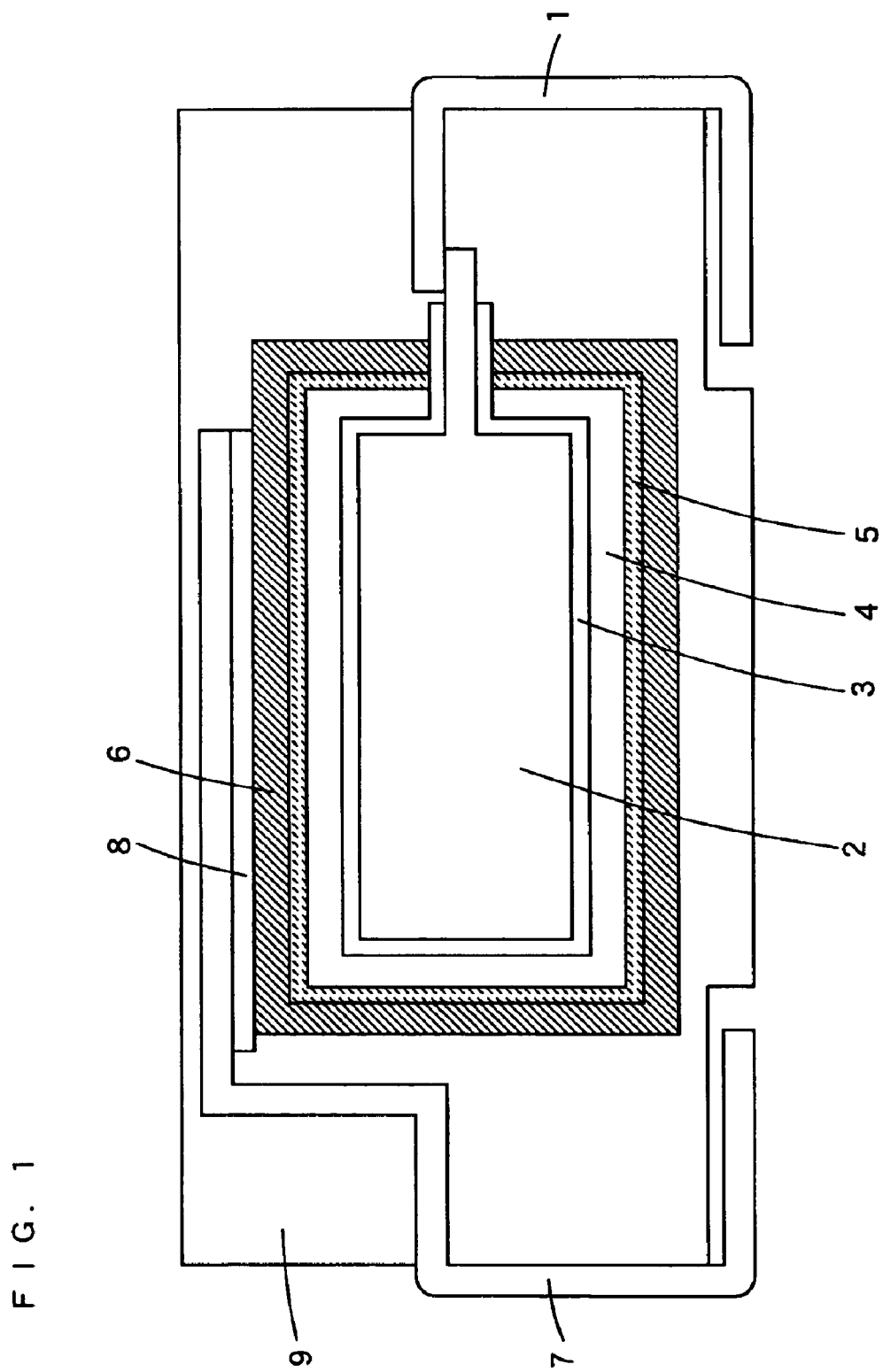
FIG. 1 is a structural diagram of a solid electrolytic capacitor according to an embodiment of the present invention.

Description will, hereinafter, be described of a solid electrolytic capacitor according to one embodiment of the present invention and a method of manufacturing the same.

FIG. 1 is a structural diagram of a solid electrolytic capacitor according to an embodiment of the present invention.

As shown in FIG. 1, the solid electrolytic capacitor has a structure in which a dielectric layer 3, an electrolyte 4, a carbon layer 5, and a metal layer 6 are formed in this order on the surface of an anode 2.

The anode 2 is connected with an anode terminal 1, and the metal layer 6 is connected with a cathode terminal 7 through a conductive adhesive 8. In addition, a mold sheath resin 9 is formed so that the respective ends of the anode terminal 1 and cathode terminal 7 are projecting outside.

The anode 2 is composed of a porous sinter of tantalum particles. A large surface area of the porous sinter of tantalum particles allows an increase in the capacity. It should be noted that the anode 2 may be composed of any other valve metal particles, such as aluminum, niobium, or titanium particles other than tantalum particles, and may also include two or more kinds of metal particles, such as tantalum, aluminum, niobium, or titanium particles.

The dielectric layer 3 is composed of a dielectric oxide film formed by anodizing the surface of the anode 2 in an aqueous solution of phosphoric acid, for example. In the present embodiment, the dielectric layer 3 is composed of tantalum oxide. Where the anode 2 is composed of a porous sinter of other metal particles, such as aluminum, niobium, or titanium particles, the dielectric layer 3 is composed of an oxide, such as aluminum oxide, niobium oxide, or titanium oxide.

The electrolyte 4 is composed of a conductive polymer, such as polypyrrole, polythiophene, or the like. The metal layer 6 is formed by preparing a silver paste by mixing silver particles having an average particle diameter of not more than 0.05 $\mu$m, a protective colloid, and an organic solvent, and applying the silver paste on the surface of the carbon layer 5 and drying the silver paste. The method of forming the metal layer 6 will be described below.

"Average particle diameter" herein represents the particle diameter at a cumulative value of 50% in the cumulative distribution curve of the particle size distribution.

Using the silver particles having an average particle diameter of not more than 0.05 $\mu$m, the surface of the carbon layer 5 is uniformly coated with the fine silver particles. This makes the contact resistance between the carbon layer 5 and the metal layer 6 smaller. As a result, a solid electrolytic capacitor having reduced equivalent serial resistance in a high-frequency region is achieved, as described below.

The average silver particle diameter is preferably not smaller than 0.01 $\mu$m. This avoids an increase in the contact resistance caused by an increase of interfaces of the silver particles. Therefore, it is preferable to use the silver particles having an average particle diameter of not smaller than 0.01 $\mu$m nor larger than 0.05 $\mu$m.

While it is preferable to use silver particles as the metal particles in terms of cost, gold particles or platinum particles may also be used in place of silver particles. Alternatively, two or more kinds of metal particles from silver particles, gold particles, and platinum particles may be used.

Description will now be made of a manufacturing method of a solid electrolytic capacitor according to an embodiment of the present invention.

First, an anode 2 composed of a porous sinter is formed by sintering the powder of tantalum particles. In this case, tantalum particles are welded with each other. It should be noted that the powder of other metal particles, such as aluminum, niobium, or titanium particles may also be used.

Then, a dielectric layer 3 composed of a dielectric oxide film is formed by anodizing the anode 2 in an aqueous solution of phosphoric acid.

The surface of the dielectric layer 3 is subsequently coated with an electrolyte 4 composed of a conductive polymer, such as polypyrrole or polythiophene, by electrolytic polymerization, for example. In this case, the electrolyte 4 is formed on the surface of the dielectric layer 3 so as to fill the gaps of the dielectric layer 3 on the surface of the porous sinter.

After that, a carbon paste is applied on the electrolyte 4 to form a carbon layer 5 on the electrolyte 4.

Meanwhile, silver particles having an average particle diameter of not larger than 0.05 $\mu$m and a protective colloid are mixed at a predetermined weight ratio, and the mixture is mixed with an organic solvent at a predetermined weight ratio to prepare a silver paste.

"Protective colloid" herein represents a hydrophilic colloid to be added in order to increase the stability of a hydrophobic colloid for the electrolyte (*Rikagaku Jiten*, 5th ed.: Iwanami, p.1300.) The use of a protective colloid allows uniform dispersion of the silver particles in the organic solvent without causing flocculation.

As the protective colloid, polyethyleneimine or the oxidized salt of polyethyleneimine may be used. Alternatively, a compound produced by the reaction of an epoxy compound with an amine compound and prepolymer containing a carboxyl group, a polymer having a plurality of tertiary amino groups or groups having basic cyclic nitride atoms chained to a main chain consisting of polyurethane and polyurea may also be used, for example. As the organic solvent, ethanol, for example, may be used.

The silver paste prepared in the aforementioned method is applied on the carbon layer 5 and dried at a predetermined temperature to form the metal layer 6 on the carbon layer 5. The drying temperature is preferably 150° C. or higher. This makes the contact resistance between the carbon layer 5 and the metal layer 6 smaller to reduce the equivalent serial resistance in a high frequency region.

Subsequently, the metal layer 6 is connected with the cathode terminal 7 through the conductive adhesive 8. The mold sheath resin 9 is then formed so that the respective ends of the anode terminal 1 and cathode terminal 7 are projecting outside. The solid electrolytic capacitor is thus prepared.

In the present embodiment, the silver particles included in the metal layer 6 have an average particle diameter of not smaller than 0.05 μm, so that the surface of the carbon layer 5 is uniformly coated with the fine silver particles. This makes the contact resistance between the carbon layer 5 and the metal layer 6 smaller. As a result, the ESR in a high frequency region is reduced.

In addition, the mixture of the silver paste and protective colloid prevents flocculation of the silver particles that may occur during preparation of the silver paste. Accordingly, the silver particles are uniformly dispersed in the silver paste, so that the contact resistance between the carbon layer 5 and the metal layer 6 is made even smaller. As a result, the ESR in a high frequency region is further reduced.

Moreover, applying the silver paste including silver particles on the carbon layer 5, and subsequently drying the silver paste at a temperature of 150° C. or higher makes the contact resistance between the carbon layer 5 and the metal layer 5 smaller to further reduce the ESR in a high frequency region.

While the sinter of the powder of tantalum, aluminum, niobium, or titanium is used as the anode 2 in the present embodiment, these are not exclusive, and the foils of these metals may also be used, for example.

EXAMPLES

In the following Examples, solid electrolytic capacitors 100 were prepared by the manufacturing method according to the above-mentioned embodiment to evaluate the ESRs.

FIG. 2 is a schematic diagram of the solid electrolytic capacitor 100 prepared in inventive examples 1 to 12 and a comparative example.

Inventive Examples 1–7

First, in the inventive examples 1 to 7, the solid electrolytic capacitors 100 were prepared in a following method under following conditions by setting the average particle diameters of the silver particles to 0.009 μm, 0.01 μm, 0.03 μm, 0.05 μm, 0.06 μm, 0.07 μm, and 0.09 μm, respectively.

Using polyethyleneimine as a protective colloid, 70% by weight of silver particles and 30% by weight of polyethyleneimine were mixed. Then, 60% by weight of the mixed substance and 40% by weight of an organic solvent of ethanol were mixed to prepare a silver paste.

Subsequently, an anode 2 composed of a porous sinter was formed by sintering the powder of tantalum particles, and the formed anode 2 was anodized in an aqueous solution of phosphoric acid to form a dielectric layer 3 composed of a dielectric oxide film on the surface of the anode 2.

The surface of the dielectric layer 3 was then coated with an electrolyte 4 composed of polypyrrole by electrolytic polymerization, for example. Further, a carbon paste was applied on the electrolyte 4 and dried at a temperature of 150° C. for thirty minutes to form a carbon layer 5.

The silver paste prepared in the aforementioned manner was then applied on the surface of the carbon layer 5 and dried at a temperature of 150° C. for thirty minutes to form a metal layer 6. Further, the anode 2 was connected with an anode terminal 1, and the metal layer 6 was connected with a cathode terminal 7.

Comparative Example

In the comparative example, a solid electrolytic capacitor was prepared in the same manner under the same conditions as in the inventive examples 1 to 7 except that the average silver particle diameter was 3 micrometers.

(Evaluation)

The solid electrolytic capacitors 100 of the inventive examples 1 to 7 and comparative example were each measured for the ESRs at a frequency of 100 kHz using an LCR meter.

Table 1 shows the ESR measurement results of the solid electrolytic capacitors 100 of the inventive examples 1 to 7 and comparative example. Note that the respective ESR measurement results of the solid electrolytic capacitors 100 of the inventive examples 1 to 7 are normalized by the ESR measurement result of the solid electrolytic capacitor of the comparative example as 100, and the normalized ESR values are represented in Table 1.

TABLE 1

|  | Average Silver Particle Diameter (μm) | ESR |
| --- | --- | --- |
| Inventive Example 1 | 0.009 | 82 |
| Inventive Example 2 | 0.01 | 68 |
| Inventive Example 3 | 0.03 | 70 |
| Inventive Example 4 | 0.05 | 71 |
| Inventive Example 5 | 0.06 | 86 |
| Inventive Example 6 | 0.07 | 91 |
| Inventive Example 7 | 0.09 | 94 |
| Comparative Example | 3.00 | 100 |

In the inventive examples 1 to 7, the ESR values were 94 or lower, which were decreased compared with the ESR value of the comparative example. For the average silver particle diameters of 0.01 μm to 0.05 μm, in particular, the ESR values resulted in 75 to 78, which were markedly decreased compared with that of the comparative example.

The results above show that the average silver particle diameter is preferably 0.01 to 0.05 μm.

Inventive Examples 8–12

In the inventive examples 8 to 12, the solid electrolytic capacitors 100 were prepared in the same manner under the same conditions as in the inventive examples 1 to 7 except that the average silver particle diameters were 0.03 micrometers for each, and the drying temperatures for the silver pastes were set to 140° C., 145° C., 150° C., 160° C., and 170° C., respectively. The inventive example 10 was the same as the aforementioned inventive example 3.

(Evaluation)

The solid electrolytic capacitors 100 of the inventive examples 8 to 12 were each measured for the ESRs at a frequency of 100 kHz using an LCR meter.

Table 2 shows the ESR measurement results of the solid electrolytic capacitors 100 of the inventive examples 8 to 12. Note that the respective ESR measurement results of the solid electrolytic capacitors 100 of the inventive example 8 to 12 are normalized by the ESR measurement result of the solid electrolytic capacitor of the inventive example 8 as 100, and the normalized ESR values are represented in Table 2.

TABLE 2

|  | Drying Temperature (° C.) | ESR |
|---|---|---|
| Inventive Example 8 | 140 | 100 |
| Inventive Example 9 | 145 | 95 |
| Inventive Example 10 | 150 | 70 |
| Inventive Example 11 | 160 | 70 |
| Inventive Example 12 | 170 | 65 |

The ESR values for the inventive examples 8 and 9 were 100 and 95, respectively. The ESR values for the inventive examples 10 to 12 were 65 to 70, which were markedly decreased compared with those of the inventive examples 8 and 9.

The results above show that the drying temperature for the silver paste is preferably 150° C. or higher.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A solid electrolytic capacitor comprising:

an anode composed of a metal;

a dielectric layer composed of an oxide of said metal and formed on the surface of said anode;

an electrolytic layer; and a cathode layer in this order, said cathode layer having a laminated structure of a carbon layer and a metal layer composed of metal particles having an average particle diameter of not larger than 0.05 μm and formed on said carbon layer, wherein said metal layer includes a protective colloid.

2. The solid electrolytic capacitor according to claim 1, wherein said average particle diameter of said metal particles is not smaller than 0.01 μm.

3. The solid electrolytic capacitor according to claim 1, wherein said metal particles include at least one kind of metal selected from the group consisting of silver, gold, and platinum.

4. The solid electrolytic capacitor according to claim 1, wherein said electrolytic layer is composed of a conductive polymer.

5. The solid electrolytic capacitor according to claim 1, wherein said anode includes at least one kind of metal selected from the group consisting of tantalum, aluminum, niobium, and titanium.

6. A solid electrolytic capacitor comprising:

an anode composed of a metal;

a dielectric layer composed of an oxide of said metal and formed on the surface of said anode;

an electrolytic layer; and a cathode layer in this order, said cathode layer having a laminated structure of a carbon layer and a metal layer composed of metal particles having an average particle diameter of not larger than 0.05 μm and formed on said carbon layer, and said electrolytic layer being composed of a conductive polymer.

7. The said electrolytic capacitor according to claim 6, wherein said metal layer includes a protective colloid.

* * * * *